Nov. 26, 1963
J. C. NEES ETAL
3,112,094
AUTOMATIC DIAPHRAGM ACTUATED VALVE
Filed Aug. 15, 1960
3 Sheets-Sheet 1
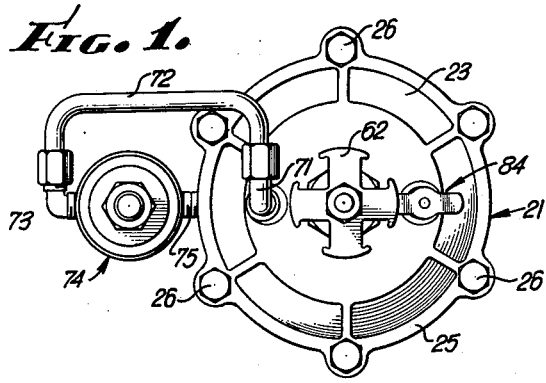
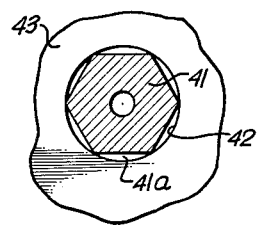
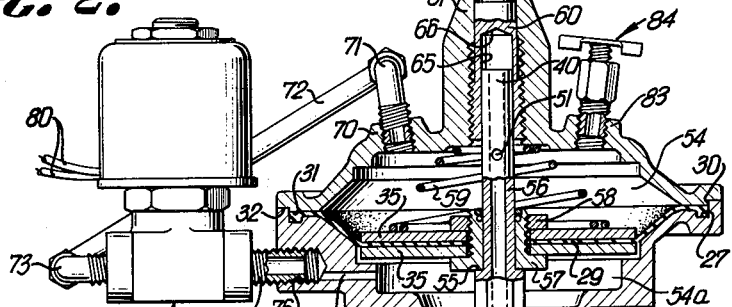
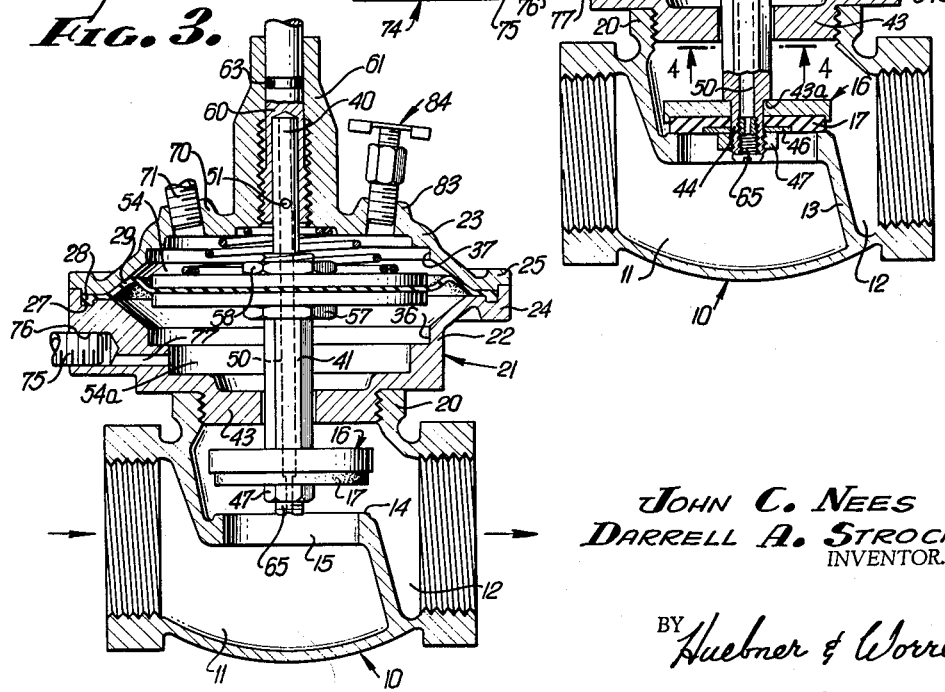
JOHN C. NEES
DARRELL A. STROCK
INVENTOR.
BY Huebner & Worrel
ATTORNEYS.

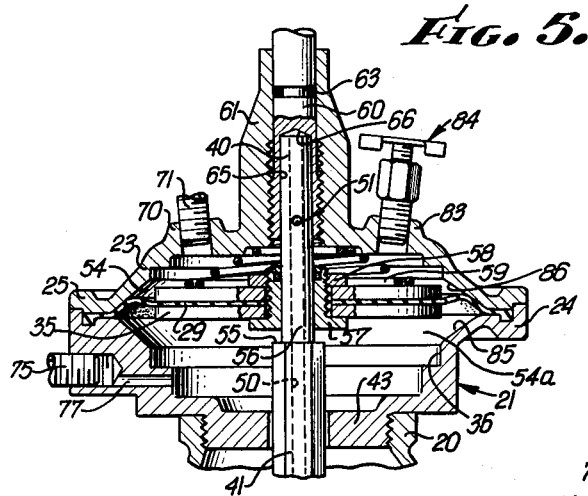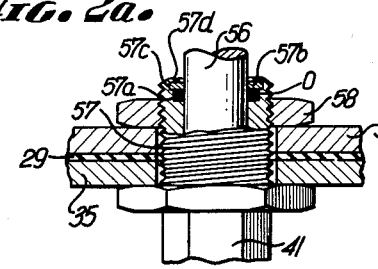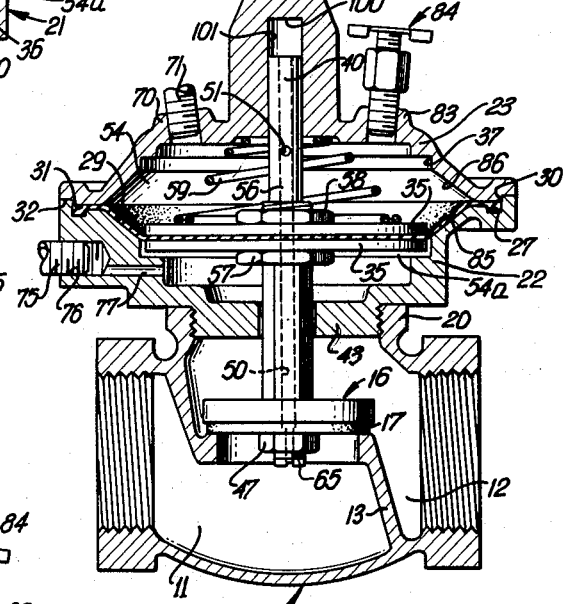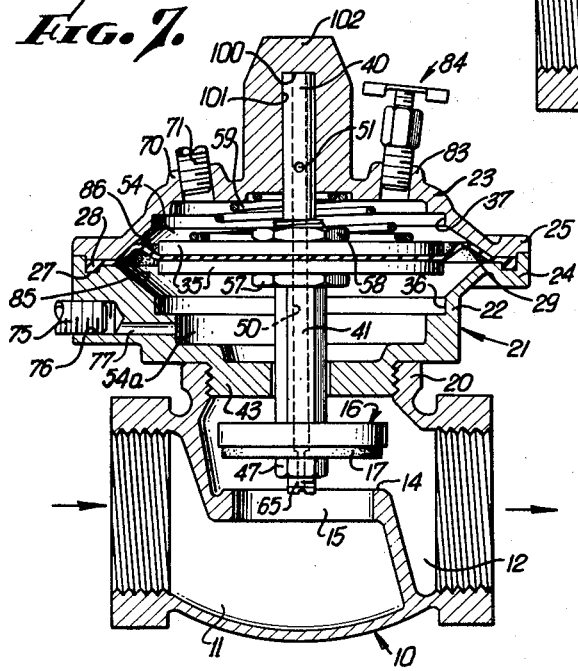

Nov. 26, 1963  J. C. NEES ETAL  3,112,094
AUTOMATIC DIAPHRAGM ACTUATED VALVE
Filed Aug. 15, 1960  3 Sheets-Sheet 3

JOHN C. NEES
DARRELL A. STROCK
INVENTORS

BY
Huebner & Worrel
ATTORNEYS.

United States Patent Office 3,112,094
Patented Nov. 26, 1963

3,112,094
AUTOMATIC DIAPHRAGM ACTUATED VALVE
John C. Nees, 1659 Alta Oaks, and Darrell A. Strock, 170 W. Grand View, both of Arcadia, Calif.
Filed Aug. 15, 1960, Ser. No. 49,713
3 Claims. (Cl. 251—30)

This invention relates to valves and a general object is to provide a diaphragm (or piston) actuated valve with a hollow stem which communicates supply line pressure into a chamber above the diaphragm whereby the diaphragm is depressed and the valve is thereby closed, and a controlled fluid communication is employed between the chamber above the diaphragm and a chamber below the diaphragm, this fluid line communication including a control valve, preferably one operated by an electrical solenoid, the control valve acting as a pilot valve to selectively determine whether the excess of pressure shall be above or below the diaphragm thereby determining whether the valve is closed or open.

A further object of the invention is to provide a hollow valve stem diaphragm or piston actuated normally-closed globe type valve of sturdy construction, relative simplicity of operation and freedom from service adjustments or replacements, and controllable through the functioning of an electrical circuit and at any convenient place close to or remote from the valve installation; and to provide in that type of valve a diversion of fluid from the high pressure side of the supply line for actuation of the valve and return of diverted fluid under conditions of flow thereof to the low pressure side of the supply line.

A more particular statement of objects contemplates the employment of a diaphragm (or piston) for reciprocating a hollow valve stem carrying a main valve head, the effective area of the diaphragm exposed to fluid pressure being greater than that of the valve head, fluid supply line pressure acting oppositely against both diaphragm and head and holding the head closed by the advantage of the surface differential so long as the pressure is held against the diaphragm, and permitting the diaphragm to yield and thus the valve head to open, by bleeding off fluid from the pressure actuating chamber of the diaphragm faster than fluid can enter the chamber through the valve stem.

A further object of the invention is to provide in such a valve construction a closed fluid circuit wherein fluid passing from the pressure actuating chamber is carried through a chamber below the diaphragm and from thence into the outlet side of the main valve. This has the advantages of avoiding loss of fluid to waste, untidiness if the waste is in the vicinity of the main valve, it provides lubrication for the valve stem in its lower guide, and avoids the necessity for any vents to atmosphere, the latter being especially undesirable when the valve is to be installed underground.

The object last described may be realized with a tubular communication between the pressure chamber and the chamber below the diaphragm, such communication being governed by a control valve, electrically or manually operated, in immediate conjunction with the main valve or remote therefrom.

The amount of axial travel by the diaphragm or piston is often subject to variation depending upon pressure and other factors, and an object of the invention is to provide structural means for adjusting the maximum opening of the main valve even though the diaphragm may over travel, that is, move farther than the axial spacing of the valve opening.

In place of a solenoid control valve we may substitute a manually operated control valve adjacent the general valve assembly in the same region as shown occupied by the solenoid valve, or the tubular communication from the upper diaphragm chamber to the lower diaphragm chamber may be carried to a point remote from the general valve assembly, and a manual control or pilot valve be placed at a convenient spot. This effects what might be described as fingertip valve control of a main valve which if of large size and operating under high pressure would require considerable manual effort to open or close by rotation of a conventional handle.

Another method of operating the main valve is to open a manual petcock provided in the upper chamber and thus permit the fluid to bleed to atmosphere or waste faster than it can enter through the orifice of the hollow valve stem. This petcock can be operated immediately adjacent the main valve if the valve is above ground. Should it be below ground, or should a remote control be desired, it is simply necessary to carry a tube from the petcock location to any desired point and install the manually operated petcock at the remote end of the tube. This arrangement does not take full advantage of our invention but can be employed where necessary or desirable.

The foregoing and other objects and advantages of the invention will become more apparent from a consideration of the description with reference to the drawings.

In the drawings:

FIGURE 1 is a top plan view of a valve assembly embodying the present invention.

FIGURE 2 is a vertical sectional view of the valve shown in FIGURE 1, with the main valve closed.

FIGURE 2a is a fragmentary enlarged sectional view taken from a central area of FIGURE 2.

FIGURE 3 is a view generally similar to FIGURE 2 showing the valve open.

FIGURE 4 is a fragmentary horizontal section taken on the line 4—4 of FIGURE 2.

FIGURE 5 is a view generally similar to the upper portion of FIGURE 3, but illustrating a different operating condition, namely, while the valve stem is at its upper adjusted limit of travel, the diaphragm has been forced relatively higher, an over travel permitted by slippage on the valve stem.

FIGURE 6 is a vertical sectional view of a second form of valve embodying the invention, being different principally in the omission of an adjustment device to control the extent of the valve opening, and the valve shown closed.

FIGURE 7 shows the same valve open.

Figure 8:
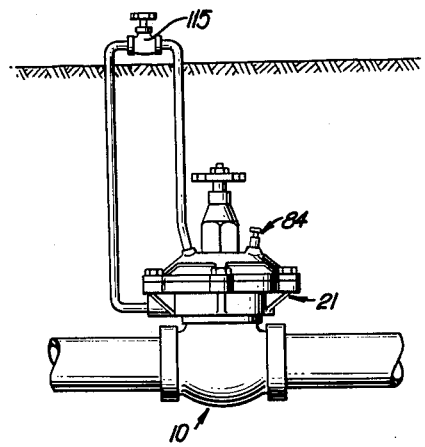
FIGURE 8 illustrates an underground installation of the valve assembly of FIGURE 1 but with a remote manual control valve in place of the solenoid valve.

Referring to FIGURES 1–5, a globe type of valve body 10 is provided with an inlet or high pressure section 11 and an outlet or low pressure section 12, the two sections being separated by a web or partition 13 embodying an annular valve seat 14 disposed in a horizontal plane, and when the valve seat is clear, affording a flow of water or other fluid from the lower region of intake section 11 vertically through a port 15 defined by the valve seat 14 and thence over and out through the outlet section 12. The port 15 is normally closed by a valve disc assembly or head 16 which includes a rubber gasket 17 for the actual contact with the valve seat 14.

Threaded into a boss 20 of the globe valve body is a diaphragm actuator housing 21. This is preferably made in two castings, a lower half 22 and an upper half 23, the two halves being formed with mating flanges 24, 25, which in final assembly are held in contiguous relationship by machine bolts 26.

The lower annular flange 24 is formed with an annular groove 27 for the reception of a peripheral bead 28 on flexible diaphragm 29. The groove 27 is bounded on the outside by a vertical wall 30 which rises above the lowermost annular surface 31 of the flange 25 and seats in a notch 32 provided around the periphery of the flange 25.

The diaphragm 29 is firmly secured between a pair of clamping discs 35, which have a common diameter enabling them to slidably enter a cylindrical offset 36 in the lower housing half 22 or a similar cylindrical offset 37 in the upper housing half 23.

The clamping discs 35 are mounted on a reciprocable valve stem 40 in a manner to be described in detail. The valve disc assembly 16 is carried at the lower end of the valve stem as illustrated. When the diaphragm assembly is in its lowermost position as shown in FIGURE 2, the valve head is closed through the agency of the valve stem 40. When the diaphragm assembly is elevated, the valve head is elevated and thus what may be characterized as the main valve is open, and to what extent depends upon the upper limit of travel of the valve stem. The maximum opening of the main valve can be adjustably controlled in the form shown in FIGURES 2–3 and is fixedly controlled in the form shown in FIGURES 6–7.

The valve stem 40 comprises a hexagonal section 41 which slidably operates in and is guided by a circular passage 42 in the bottom web or bulkhead 43 of the lower section of the diaphragm housing. By this arrangement guide means are afforded through contact of the corner elements of the hexagonal surface structure, but the fit provides fluid passages 41a between the annular wall 42 and the plane surfaces of the stem 40.

The lower end of the hexagonal cross-section portion of the stem provides a shoulder 43a adjacent an extension 44 of reduced diameter against which shoulder the valve head 16 abuts, this head including the rubber disc 17 and an associated washer 46 being clamped to the valve stem by a nut 47.

The valve stem 40 is hollow, as previously mentioned, providing a passage 50 from the extreme lower end of the stem with an intersecting port 51 completing communication from the interior of the stem into an upper chamber 54 formed by the upper housing section 23 and the diaphragm 29. A lower chamber 54a is formed by the lower housing section 22 and the diaphragm.

The upper end of the hexagonal section 41 of the stem provides a shoulder 55 adjacent an extension 56 of reduced diameter, on which shoulder is removably seated an externally threaded boss or sleeve 57. This sleeve extends through the clamping discs 35 and the diaphragm 29 which are held together by a nut 58 screwed onto the threads of the boss 57. The sleeve is slidable on the reduced extension 56 of the valve stem (see FIGURE 5).

The chamber 54 should be sealed off from the chamber 54a to prevent uncontrolled leakage of fluid from chamber 54, and an O-ring is used for such purpose. The O-ring seats in an annular recessed ledge 57a, being retained therein by a washer 57b seating in an offset ledge 57c and staked therein as shown at 57d.

A tapered helical spring 59 is interposed between the diaphragm assembly and the upper end wall of the diaphragm housing 23 to cooperate with fluid pressure in the chamber in starting the diaphragm assembly downward when that action is desired, and has especial utility if the supply line pressure as delivered into the chamber 54 is weak.

The reduced upper end section of the valve stem is guided in a hollow adjusting member 60 which projects outwardly through a bushing 61 in which it is threadably engaged. A conventional cross 62 at the upper end of the member 60 enables the stem to be threaded up or down in the bushing 61. An O-ring 63 is provided to prevent leakage through the bushing. The interior of the member 60 comprises a bore 65 which functions as an upper guide for the valve stem, and the bore has a terminal dead end 66 at a predetermined location. This enables the maximum opening of the main valve to be adjustably determined by reason of the fact that the upper end of the valve stem will strike against the dead end 66 of the bore. The diaphragm assembly may nevertheless rise under operating forces to a further elevation, sliding on the valve stem against the action of the spring 59, should suction in the upper chamber 54 or back pressure in the lower chamber 54a or both be of such magnitude as to compel the movement.

A hollow terminal orifice screw 65 is ordinarily inserted at the lower end of the valve stem 40 to provide a selected size of orifice for entry of fluid into the hollow valve stem. The size of orifice preferably selected is smaller than the fluid passages provided by the spaces between the hexagonal surfaces of the valve stem and the circular guide in which it reciprocates.

An internally threaded boss 70 is formed in the upper wall of the upper housing section 23, and a fitting 71 with a tube 72 joins a fitting 73 in a solenoid operated control valve 74. Communication from the valve 74 occurs through a fitting 75 threaded into an opening 76 in the lower half of the housing, a fluid passage 77 extending from the opening 76 to the chamber 54a below the diaphragm.

The solenoid operated valve 74 is of any conventional type, which may be actuated from any suitable electrical source through conducors 80, the valve mechanism itself providing for the simple opening or closing of communication through the tube 72 between the upper chamber and the lower chamber. The size (capacity of flow volume) of the communication from upper chamber to lower chamber is greater than that of the stem passage 50 as restricted by the orifice screw 65.

A second hollow boss 83 similar to the boss 70 is provided for outside communication through the housing section 23 to the upper chamber 54, and a conventional manually operated petcock 84 is threadedly inserted in the boss 83, and provides a means for bleeding liquid from the upper chamber 54 to atmosphere or waste if that method of operation of the valve be desired.

It should be noted that the effective surface area of the diaphragm assembly is shown as greater than that of the valve head so that with equal opposed fluid pressure, action of the diaphragm dominates the valve head.

We will next describe the operation of the entire valve assembly. It is assumed that the valve is closed as shown in FIGURE 2. This condition follows from the fact that (fluid) water pressure in the globe valve intake section 11 is communicated through the orifice element 65 and the passage 50 of the valve stem 40 out through orifice 51 into the chamber 54 above the diaphragm. The petcock 84 is assumed to be closed and the solenoid valve 74 is also closed. There is no place for the water pressure in the chamber 54 above the diaphgm to escape or exhaust. The pressure per square inch in that chamber is equal to the pressure per square inch in the section 11, and inasmuch as the combined exposed area of the upper clamp ring or disc 35 and the diaphragm 29 is greater than that of the globe valve head assembly 16, the differential result in supply line pressure holds the main valve closed. The spring 59 contributes in a minor way to the holding action (but its principal purpose is to start the diaphragm down when the control valve is operated for closing the main valve).

If the solenoid control valve is then opened, water and consequently, pressure, bleeds off from the chamber 54 above the diaphragm into the chamber 54a below the diaphragm, the latter being in liquid communication with the low pressure or outlet side 12 of the globe valve, as heretofore mentioned, and the flow out of the upper chamber is in greater volume than it can enter, because of the differential in size of passages. The result is that supply line pressure in the section 11 automatically raises the valve head and thus effects opening of the main globe valve. Water may continue to rise through the hollow valve stem into the chamber above the diaphragm, but whatever water enters that chamber bleeds off into the lower chamber and thence into the low pressure side of the globe valve and flows out with the main flow.

If the solenoid valve is then actuated to close and thus cut off fluid communication between the chambers above and below the diaphragm, pressure is again built up in the chamber 54 and the diaphragm is thus depressed, which in turn forces the valve stem downwardly and thus closes the main globe valve. Under conditions where the water pressure is sufficient, the closing of the valve can be accomplished without the use of the spring 59, and even where the water pressure is low the valve will operate to close, but under some conditions may operate slowly. The spring therefore accelerates the closing action of the valve and has a desirable function in that respect, at least under certain conditions.

During the opening and closing function the diaphragm assembly may slide to some extent on the reduced upper section 56 of the valve stem 40 depending upon, among other things, the amount of suction which may be pulled in the upper chamber. Irrespective of the magnitude of axial movement of the diaphragm assembly, the valve stem will be limited in its upward movement and consequently the extent of the opening of the main valve will be thus restricted, by the upper end of the valve stem striking against the dead end 66 of the bore 65 in the adjusting screw sleeve 60. If the diaphragm assembly has slid upwardly away from the shoulder 55 at the upper end of the hexagonal section 41 of the valve stem, as seen in FIGURE 5, it will return to its seat on said shoulder when manipulation has occurred of the necesasry parts to close the main valve.

In its lowermost or closed position the marginal portion of the diaphragm will normally repose against a frusto-conical shoulder 85 in the lower housing section 22, and when the valve is open the same diaphragm portion or at least some of it will normally rest against a complementary frusto-conical shoulder 86 in the upper housing section 23. The described condition coupled with the fairly close fit of the diaphragm discs 35 in the cylindrical notches of lower and upper halves of the housing tends to minimize shearing or stretching of the diaphragm material.

To cause the main valve to open more or less it is simply necessary to raise or lower the adjusting screw sleeve 60.

The form of valve shown in FIGURES 6 and 7 operates in the identical manner as described for the form of FIGURES 1–5 except for adjustability of the axial travel of the valve stem and consequently the degree of opening of the main valve. In this case upward axial travel of the valve stem is limited by the fixed position dead end 100 which terminates the guide bore 101 in the hollow crown boss 102 which replaces the hollow boss or sleeve 61 of the form of valve first described.

Figure 10:
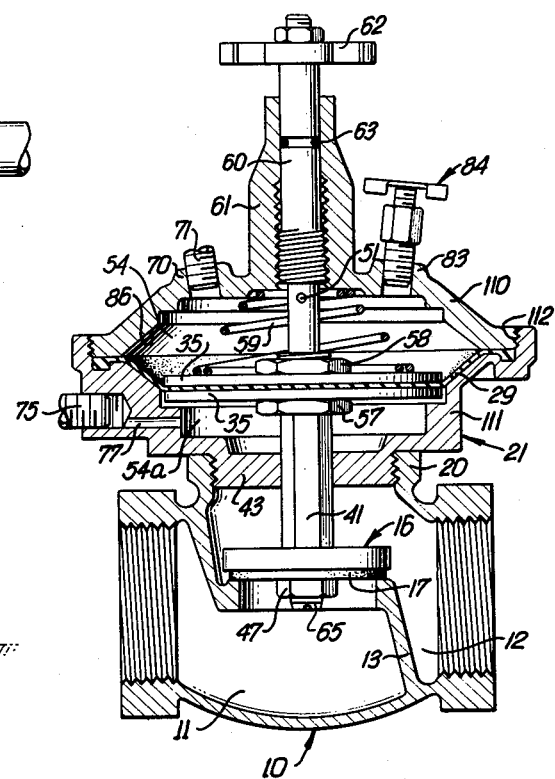
FIGURE 10 is a vertical section of a valve assembly generally similar to FIGURE 1 but modified in the structure whereby two sections of the diaphragm housing are mounted together by mutually engaging threads.

The form of valve shown in FIGURE 10 is identical in operation to the form of FIGURES 1–5, and is identical in structure except that the upper housing section 110 is bodily threaded into the lower section 111 as at 112.

Any of the valves may be also operated manually by utilizing a fingertip control or pilot valve 115 which is substituted for the solenoid valve 74 and may be placed at any convenient location close to or remote from the main valve assembly, as seen in FIGURE 8.

Figure 9:
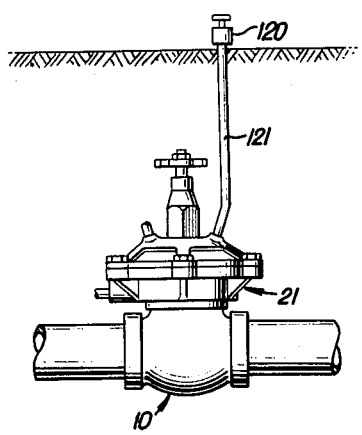
FIGURE 9 is a view of an installation similar to FIGURE 8 but with the petcock of FIGURE 1 mounted at the end of a tube remote from the main valve.

In lieu of employing the solenoid valve or its substitute manual valve as previously described, the main valve may be actuated to open by merely opening the petcock 84, or a petcock 120 (see FIGURE 9) which is substituted for the petcock 84 at a point remote from the main valve assembly, being connected to the latter through a tube 121.

When the petcock either immediately associated with the upper chamber or whether remote therefrom, is opened, water bleeds from the upper chamber faster than it can enter, because the cross-sectional area of the petcock passage is greater than the cross-sectional area of the screw orifice 65. Under these operating conditions, water will continue to bleed off into exhaust or waste so long as the petcock remains open. In order to close the main valve, it is simply necessary to close the petcock whereupon pressure will again build up in the chamber above the diaphragm and close the main valve.

While reference has been made to a globe type of main valve, the invention is not restricted to that particular form, it being applicable to any kind of a valve wherein reciprocal movement of a valve stem effects movement of a head or disc which closes off or opens a passage between an intake side and an outlet side of a fluid line.

Furthermore, some features of the invention are applicable to a piston actuated valve instead of a diaphragm actuated valve. Piston and diaphragm are ordinarily regarded as equivalent in a broad sense in the valve art. In this case a cylinder would be substituted for the diaphragm housing, and a piston substituted for the diaphragm. The piston would separate the cylinder into upper and lower chambers, and the remaining construction and the operation would be the same as described.

With respect to the differential area between the diaphragm (or piston) and the main valve head, while this relationship is preferred for efficient operation, it is possible to employ the principles of the present invention in a structure where the diaphragm or piston is not of greater area than the valve head. To do this, the spring 59 or its equivalent should be of sufficient compressive strength to adequately supply the differential in force needed to hold the main valve closed when the pressure is equalized in the upper chamber and the intake side of the main valve, but weak enough to readily yield when pressure drops in the upper chamber.

While the invention has been shown and described herein in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices.

In the claims the term bowl is employed as a matter of convenience to designate in a specific sense the valve body 10, and also in a broad sense any type of fluid (liquid or gas) container wherein a partition separates an intake or relatively high pressure side from an outlet or relatively low pressure side, and a valve seat defines a passage from one side to the other.

The actuating and control features of our device, including the valve head, can be supplied as adapters for attaching to other types of bowls than that illustrated, including bowls (broadly interpreted) which may comprise a built-in part of a tank unit or other apparatus.

Having described our invention, what we claim as new and desire to secure by Letters Patent is:

1. In a combination comprising a supply line pressure actuated main valve controlled by a secondary valve in which the main valve embodies a bowl divided by a partition into a high pressure intake side and a low pressure outlet side, the partition including a disc valve seat encompassing a fluid passage from the intake side to the outlet side, and a disc valve head in cooperating association with the valve seat to close or open the passage, actuating and control means comprising a housing axially adjacent the valve seat and substantially hermetically coupled with the bowl, a diaphragm member of greater area than the area of the valve head axially aligned with the valve seat and transversely substantially hermetically bridging said housing and dividing the latter to form upper and lower chambers, a reciprocable hollow rigid valve stem mounting the valve head and extending in axial alignment therewith from the intake side through the lower chamber and diaphragm member and into the upper chamber and providing a relatively small continuously open fluid communication from the intake side to the upper chamber, a thrust collar on the diaphragm member and a shoulder on the valve stem said collar and shoulder being interengageable for transmitting downward thrust of the diaphragm member to the valve stem for closing the main valve, said upper chamber being provided with relatively large fluid communication means extending from the upper chamber to the lower chamber, the upper chamber being otherwise substantially fluid tight, a secondary solenoid operated shut off valve in the latter fluid communication means, the housing including a circular guide bore for the valve stem extending from the lower chamber to the outlet side, the valve stem embodying a length of polygonal cross section slidable in the bore with angular edges of the stem engaging the bore and the space between flat plane surfaces of the stem and the circular surface of the bore affording relatively large fluid communication from the lower chamber to the outlet side and the lower chamber being otherwise substantially fluid tight, whereby when the secondary valve is closed supply line pressure from the intake side is communicated through the valve stem into the upper chamber and acts upon the diaphragm member to thrust the same downwardly and through the valve stem to hold the valve head closed upon the valve seat, and when the secondary valve is opened fluid bleeds from the upper chamber to the lower chamber and from the lower chamber to the outlet side faster than fluid can enter the upper chamber through the valve stem and supply line pressure is thus reduced in the upper chamber so that supply line pressure acting upon the valve head lifts it to open position.

2. A device as defined in claim 1 wherein the thrust collar is releasably engageable with the shoulder on the stem for closing the main valve and is slidable on the stem in a direction for opening the main valve, and stop means limiting the opening movement of the stem, whereby the diaphragm member may move axially a greater distance than the stem.

3. A device as defined in claim 2 in which a tapered helical compression spring is located in the upper chamber with its base seating upon the diaphragm member and its crown pressing against a wall of the housing.

References Cited in the file of this patent

UNITED STATES PATENTS

| | | |
|---|---|---|
| 2,357,133 | Rider | Aug. 29, 1944 |
| 2,573,369 | Snoddy | Oct. 30, 1951 |
| 2,833,304 | Fish | May 6, 1958 |
| 2,882,006 | Reinecke | Apr. 14, 1959 |
| 2,883,998 | Broughton | Apr. 28, 1959 |
| 2,934,307 | Henderson | Apr. 26, 1960 |
| 2,943,636 | Reed et al. | July 5, 1960 |
| 3,011,516 | Au Werter | Mar. 31, 1961 |
| 3,012,751 | Hauser | Dec. 12, 1961 |

FOREIGN PATENTS

| | | |
|---|---|---|
| 395,496 | France | Dec. 29, 1908 |